(12) United States Patent
Ng

(10) Patent No.: US 6,270,349 B1
(45) Date of Patent: Aug. 7, 2001

(54) EDUCATIONAL TOOL FOR DEFENSIVE DRIVING

(76) Inventor: Frederick M. Ng, 295 Hendon Avenue, North York, Ontario (CA), M2M 1B3

( * ) Notice: Subject to any disclaimer, the term of this patent is extended or adjusted under 35 U.S.C. 154(b) by 0 days.

(21) Appl. No.: 09/482,282

(22) Filed: Jan. 13, 2000

(51) Int. Cl.[7] .................................................. G09B 9/04
(52) U.S. Cl. .................................. 434/62; 434/67; 434/69
(58) Field of Search ................................. 434/29, 62, 67, 434/69, 70; 296/84.1, 86, 87, 88, 92, 96, 96.2

(56) References Cited

U.S. PATENT DOCUMENTS

| D. 266,008 | | 8/1982 | Klawitter | D19/63 |
|---|---|---|---|---|
| 2,091,154 | * | 8/1937 | Matzner | 434/67 |
| 2,672,696 | * | 3/1954 | Wentz | 434/67 |
| 3,107,437 | * | 10/1963 | Larlham | 434/67 |
| 3,283,418 | * | 11/1966 | Brewer | 434/69 |
| 3,525,175 | | 8/1970 | Wolf . | |
| 3,606,328 | * | 9/1971 | Delphia | 434/67 |
| 3,657,457 | | 4/1972 | Poynter | 35/11 |
| 3,659,375 | | 5/1972 | Stubbmann . | |
| 3,866,232 | * | 2/1975 | Weigt | 343/713 |
| 4,032,295 | * | 6/1977 | Meyer | 446/129 |
| 4,082,345 | * | 4/1978 | Willey | 296/78.1 |
| 4,087,110 | * | 5/1978 | Vetter | 280/289 S |
| 4,196,528 | * | 4/1980 | Foerst | 434/67 |
| 4,214,381 | * | 7/1980 | Clark | 434/67 |
| 4,323,249 | | 4/1982 | Brady | 273/249 |
| 4,343,503 | * | 8/1982 | Samuelson | 296/84 D |
| 4,465,315 | * | 8/1984 | Barstow | 296/78.1 |
| 4,488,750 | * | 12/1984 | Gerber | 296/78 R |
| 4,830,423 | * | 5/1989 | Nebu | 296/78.1 |
| 4,846,686 | * | 7/1989 | Adams | 434/61 |
| 5,015,189 | * | 5/1991 | Wenzinger | 434/63 |
| 5,083,325 | * | 1/1992 | Vitullo | 4/479 |
| 5,158,036 | * | 10/1992 | Stoddard | 114/361 |
| 5,184,956 | | 2/1993 | Langlais | 434/69 |
| 5,346,398 | * | 9/1994 | Nakahata | 434/67 |
| 5,490,573 | * | 2/1996 | Hagiwara | 180/68.1 |
| 5,833,298 | * | 11/1998 | Min | 296/96.13 |
| 5,947,052 | * | 9/1999 | Deising | 114/361 |
| 5,954,385 | * | 9/1999 | Moore | 296/96.2 |

\* cited by examiner

*Primary Examiner*—Jacob K. Ackun, Jr.
*Assistant Examiner*—Kent Fernstrom

(57) ABSTRACT

An apparatus and method consisting of a model of a vehicle dashboard, steering wheel, windshield area and illustration of a driving situation or location attached to and extending in front of the vehicle simulator. The student driver follows highlighted arrows imprinted on the illustration to view the driving area and the dashboard instruments with a specific eye movement pattern. The specific eye movement pattern taught is to look at the center, scan left, look to the center, scan right, look to the center, check the mirror, look to the center, and check the instruments. The windshield of the apparatus contains a center mark comprising a small hole directly in front of the student driver that indicates the very small area of central vision that can be viewed and maneuvered effectively simulating a scanning eye movement pattern. The student driver moves his "central vision" from area to area systematically in order to be aware of all that is happening in the surrounding driving vicinity.

5 Claims, 2 Drawing Sheets

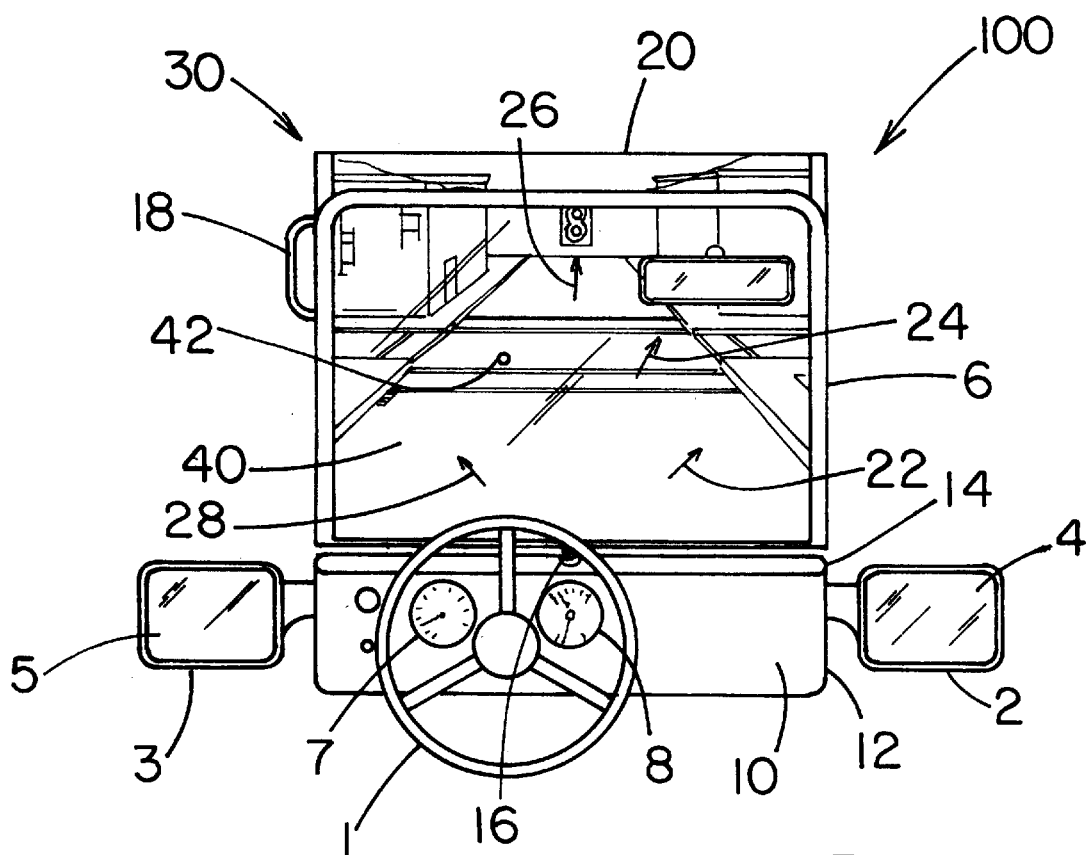
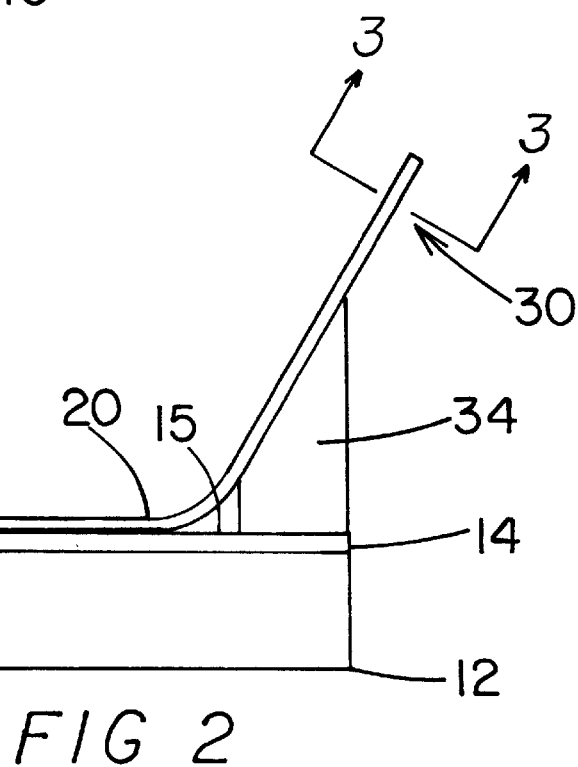

EDUCATIONAL TOOL FOR DEFENSIVE DRIVING

BACKGROUND OF THE INVENTION

1. Field of the Invention

The present invention relates to an apparatus and method for training novice drivers to scan the driving area with an effective eye-movement pattern.

2. Description of the Prior Art

Indoor training aids for driver training instruction are known in the prior art. U.S. Pat. No. 3,657,457 discloses a simulated wheel and dashboard from which the driver can maneuver a miniature car. U.S. Pat. No. 5,184,956 discloses an indoor simulator with a wheel, dashboard, screen opposite the driver and at least one synthetic image in a rear view mirror. U.S. Pat. No. 4,323,249 discloses a board game for learning to solve defensive driving problems. What is needed beyond the prior art is an instructional tool for training a student driver in the specific technique of scanning while viewing multiple objects such as the dashboard, rear view mirrors and multiple objects in the forward area of vision. Such a device should be designed so that it supports teaching one particular skill of achieving effective eye movement patterns.

SUMMARY OF THE INVENTION

The present invention meets the needs and solves the problems identified above by providing an apparatus and method consisting of a model of a vehicle dashboard, steering wheel, windshield area and illustration of a driving situation or location attached to and extending in front of the vehicle simulator. The student driver is monitored by an instructor and follows highlighted arrows imprinted on the illustration to view the driving area and the dashboard instruments with a specific eye movement pattern. The specific eye movement pattern taught is to look at the center, scan left, look to the center, scan right, look to the center, check the mirror, look to the center, and check the instruments. The windshield of the apparatus contains a center mark comprising a small hole directly in front of the student driver that indicates the very small area of central vision that can be viewed and maneuvered effectively simulating a scanning eye movement pattern. The student driver moves his "central vision" from area to area systematically in order to be aware of all that is happening in the surrounding driving vicinity. This awareness will prepare the driver to effectively respond to upcoming situations. A selection of road pictures allows the student driver to practice with different driving situations such as night driving, driving in cities, and driving with four lanes.

The foregoing and other objects, features and advantages of the invention will be apparent from the following more particular description of a preferred embodiment of the invention, as illustrated in the accompanying drawings wherein like reference numbers represent like parts of the invention.

BRIEF DESCRIPTION OF THE DRAWINGS

FIG. 1 is a front view of the apparatus

FIG. 2 is a side view of the apparatus

DESCRIPTION OF PREFERRED EMBODIMENTS

Figure 3:
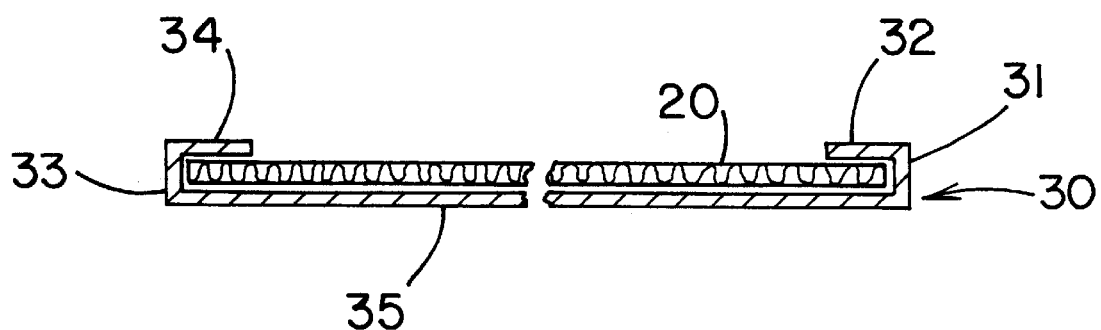
FIG. 3 is a cross sectional view along line 3—3 of FIG. 2.

In FIG. 1, training apparatus 100 has dashboard 10, wheel 1, first mirror frame 2, first mirror 4, second mirror frame 3, second mirror 5, first instrument 7, second instrument 8, windshield frame 6, handle 18, ball joint 16, support 14, windshield 40, central vision hole 42, picture frame 30, first instructional picture 20, first instructional arrow 22, second instructional arrow 24, third instructional arrow 28 and fourth instructional arrow 26.

In FIG. 2. Windshield frame 6 is shown in the vertical position. Windshield frame 6 is hingedly engaged by a ball and socket joint to support 14 and can rotate about ball joint 16 approximately 45 degrees away from steering wheel 1 and approximately 45 degrees each way to the left or to the right of steering wheel 1. First mirror frame 2 is fixedly engaged to bottom 12. Support 14 is fixedly engaged to bottom 12. Picture stand 34 is fixedly engaged to support 14 and picture frame 30 is fixedly engaged to picture stand 34. First picture 20 is removably engaged in picture frame 30. First picture 20 extends downward from picture frame 30 and along support top 15 of support 14.

FIG. 3 depicts a cross sectional view along line 3—3 in FIG. 2 of picture frame 30 and first picture 20. Picture frame 30 has picture frame rear section 35. Picture frame first end 31 is fixedly engaged at a 90 degree angle to picture frame rear section 35 and picture frame first arm 32 is fixedly engaged at a 90 degree angle to picture frame first end 31. Picture frame second end 33 is fixedly engaged at a 90 degree angle to picture frame rear section 35 and picture frame second arm 34 is fixedly engaged at a 90 degree angle to picture frame second end 33. The width of first picture 20 is sufficient to extend into the space between picture frame first end 31 and picture frame first arm 32 and the space the between picture frame second end 33 and picture frame second arm 34. The width of first picture 20 is less than the distance between picture frame first end 31 and picture frame second end 33.

Figure 4:
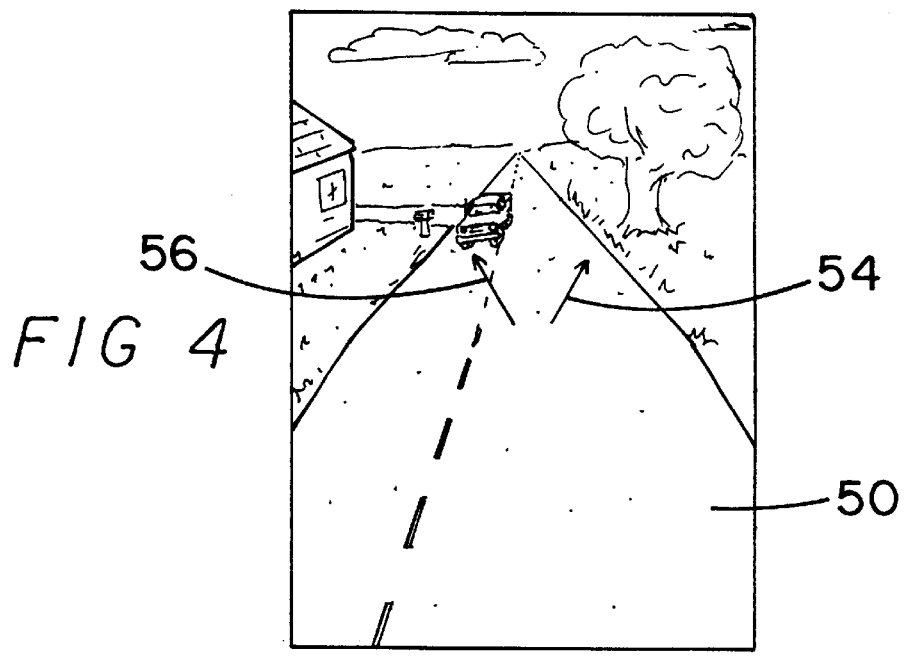
FIG. 4 is a front view of an alternate screen.

FIG. 4 depicts second picture 50 with a different scene from first picture 20 (See FIG. 3). Second picture 50 has second picture first arrow 54 and second picture second arrow 56.

The apparatus can be employed in a method of training a student driver in effective eye movement patterns by the following steps: seating said student behind training apparatus 100, identifying the central vision hole which is a three degree aperture on the windshield 40 to the student, responsive to first picture 20 being placed in picture frame 30 and identifying the three degree vision aperture on the windshield 40 to the student, causing the student to look to the center, causing the student to scan to the left, causing the student to return to look to the central vision hole 42; causing the student to scan to the right, causing the student to return to look to the central vision hole 42, causing student to look to the mirror 4, causing the student to look to the center; and causing the student to check first instrument 7 and second instrument 8. First picture 20 can be removed from picture frame 30 and a second picture inserted in picture frame 30 and, responsive to instructional arrows on second picture 50, causing the student to scan in the direction of second picture first arrow 54 and second picture second arrow 56 and return to the central vision hole 42 after each scan.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

I claim:

1. A training device for student driver instruction in the area of eye movement patterns comprising:
    a dashboard fixedly connected to a base:
    a wheel rotatably connected to said dashboard;
    at least one mirror connected to said base;
    a windshield frame rotatably connected to said base;
    a windshield removably engaged to said windshield frame;
    a picture frame fixedly connected to a picture frame support; and
    a support fixedly connected to said dashboard; wherein said windshield has a central vision hole representing three degree central vision.

2. The windshield frame of claim 1 further comprising a handle.

3. The windshield frame of claim 1 wherein said windshield frame can rotate up to approximately 45 degrees forward of the vertical and approximately 45 degrees to the left or to the right of the horizontal.

4. The dashboard of claim 1 further comprising a plurality of instruments.

5. The training device of claim 1 further comprising a plurality of pictures wherein said pictures are sized to fit the picture frame.

* * * * *